H. JONES & R. C. AUGUR.
COMPOSITION FILLED BRAKE SHOE.
APPLICATION FILED JAN. 2, 1914.

1,213,379.

Patented Jan. 23, 1917.
2 SHEETS—SHEET 1.

Attest:
R. Richardson
R. N. Flint.

Inventors:
Harry Jones and
Robert C. Augur
George Cook Atty
by

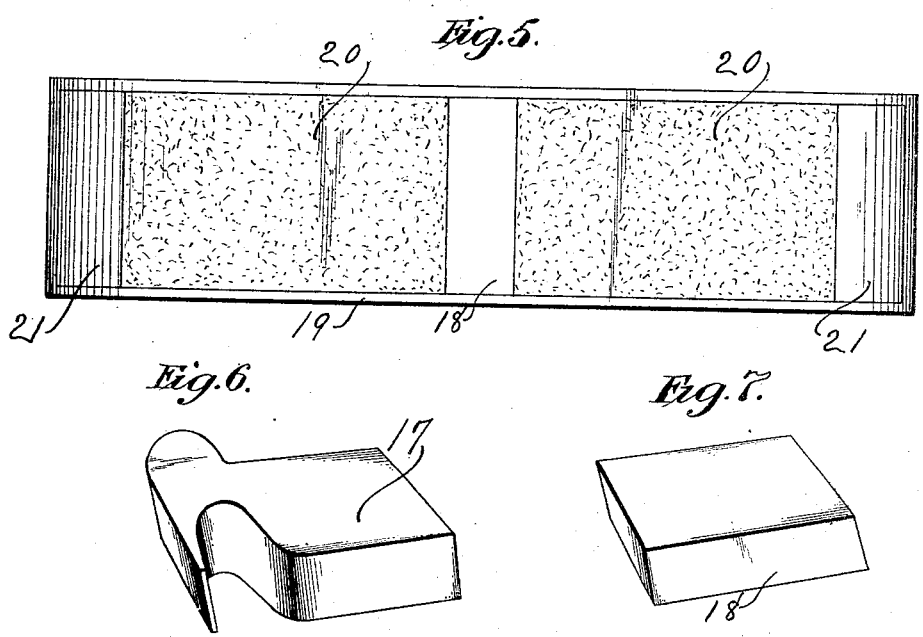

UNITED STATES PATENT OFFICE.

HARRY JONES AND ROBERT C. AUGUR, OF SUFFERN, NEW YORK, ASSIGNORS, BY MESNE ASSIGNMENTS, TO THE AMERICAN BRAKE SHOE & FOUNDRY COMPANY, OF WILMINGTON, DELAWARE, A CORPORATION OF DELAWARE.

COMPOSITION-FILLED BRAKE-SHOE.

1,213,379.  Specification of Letters Patent.  Patented Jan. 23, 1917.

Application filed January 2, 1914. Serial No. 809,821.

*To all whom it may concern:*

Be it known that we, HARRY JONES and ROBERT C. AUGUR, citizens of the United States, and residents of Suffern, in the county of Rockland and State of New York, have made and invented certain new and useful Improvements in Composition-Filled Brake-Shoes, of which the following is a specification.

Our invention relates to brake shoes designed for use upon railway vehicles, and particularly to that kind or type thereof commonly referred to as a composition filled shoe, and in which the body portion thereof comprises a non-metallic material, or a composition made for the most part of non-metallic substance the said body portion being supported by a suitable metallic shell, or casing, applied thereto in a plastic condition and molded or pressed into intimate contact therewith.

As different service conditions often require different degrees of friction in the brake shoe, it is frequently desirable to vary the character of the wearing face of a composition filled brake shoe in order to adapt the latter to a particular service, as by providing a greater or less area of metal in the wearing face which is made up partly of metal and partly of a non-metallic substance. The frictional or retarding qualities of the brake shoe may thereby be varied and modified, all with the end in view of securing a shoe which will wear away as slowly as possible, while at the same time possessing frictional and retarding qualities suitable for the service for which it is designed.

The object of our invention is therefore to provide a composition filled brake shoe in which provision is made for conveniently providing metallic areas in the wearing face of a composition filled shoe, such areas varying in extent according to the service for which the shoe is required.

With the above and other objects in view, our invention consists in the improved composition filled brake shoe illustrated in the accompanying drawings and hereinafter described and claimed, and in such variations and modifications thereof as will be obvious to those skilled in the art to which our invention relates.

Figure 1:
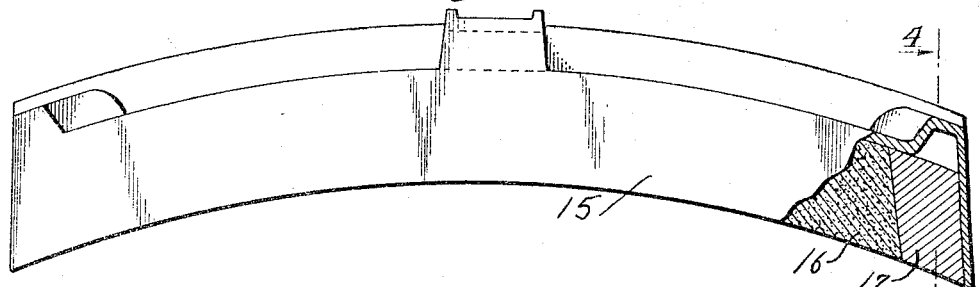
Figure 2:
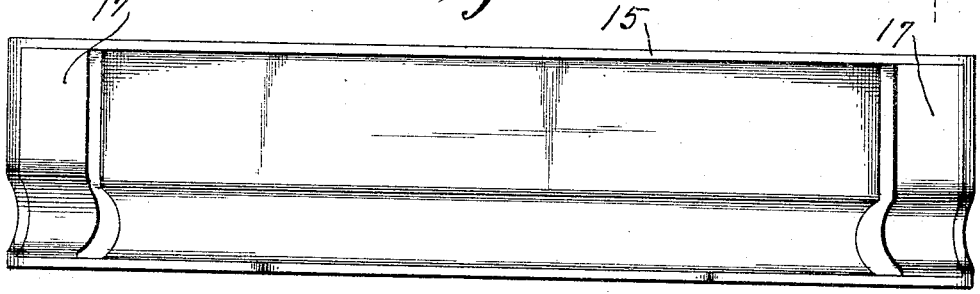
Figure 3:
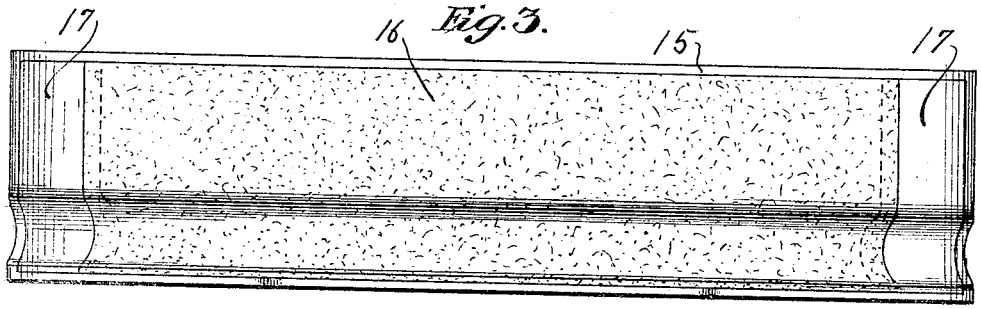
Figure 4:
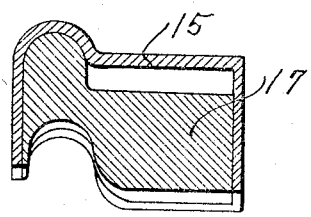

In the drawings wherein the preferred embodiment of our invention is illustrated: Figure 1 is a view showing a flanged shoe made in accordance with our invention, a portion thereof being broken away to better illustrate certain features thereof; Fig. 2 is a view showing the supporting shell and end blocks of the shoe, the composition filling being omitted; Fig. 3 is a view showing the wearing face of the shoe shown in Fig. 1; Fig. 4 is a view showing a section taken upon a transverse plane indicated by the line 4, 4, Fig. 1; Fig. 5 is a view showing the wearing face of an un-flanged shoe made in accordance with our invention; Fig. 6 is a view showing a form of metallic block employed in a flanged shoe, in perspective; Fig. 7 is a similar view showing a form of block used in un-flanged shoes.

Referring to the drawings, the reference numeral 15, Figs. 1 to 4, designates a metallic shell or casing, made hollow, and designed to contain and support the non-metallic or composition body portion 16 of the shoe until the same is worn out in service, or worn to such an extent as to be no longer serviceable. This supporting shell may be made of cast or malleable iron, or of thin plate or sheet metal pressed and shaped into proper form, or in other ways, as the particular form or features of construction of the supporting shell or casing is immaterial. The non-metallic or composition body portion 16 may also be made in accordance with any of the well known formulæ or methods common in the art relating to composition filled brake shoes, and the same may be applied to the shell in a plastic condition and under pressure, or otherwise; or first molded to form a block to be thereafter placed in the shell or support and secured thereto; these being matters well understood and within the knowledge of those skilled in the art.

Referring still to Figs. 1 to 4, and 6, the reference numeral 17 designates two metallic blocks located within the shell or casing 15, and in contact with the end walls thereof. These blocks extend to the wearing face of the shoe so as to be worn away simultaneously with the body and shell, and, while they are shown as approximately rectangular in outline, as seen looking toward the wearing face of the shoe, their form is of secondary importance. These blocks preferably fit somewhat loosely in the shell or casing so that they may be easily placed therein and, in the form of our invention illustrated in said figures, are not secured to the supporting shell or casing. The metallic blocks are preferably placed at the ends of the shoe, for being harder than the composition body portion, the latter is thereby protected from breaking up or crumbling, and permit the shoe to wear away more uniformly throughout its length. The blocks may, however, be placed anywhere in the supporting shell or casing; thus, for example, Fig. 5 illustrates a shoe having a central metallic block 18, located within the shell or casing 19 containing the composition body portion 20. This figure shows the shoe as having end blocks 21, in addition to the central block 18, as end blocks are generally desirable, although not indispensable, in carrying out our invention.

Figs. 1 to 4 illustrate our invention as embodied in a brake shoe having a flange to engage the flange of a car wheel, while Fig. 5 shows our invention as embodied in an unflanged shoe.

Having thus described and explained our invention, we claim and desire to secure by Letters Patent:

1. A brake shoe consisting of a shell or casing substantially trough-shape, metallic blocks positioned within said shell, conforming in shape to, and contacting throughout with, the end walls of said shell and supplementing the same, and a composition body portion contained within said shell and forming, in conjunction with said metallic blocks and casing, a wearing body.

2. A brake shoe consisting of a casing substantially trough-shape, including end walls, metallic blocks positioned within said casing, extending between the side walls thereof, said metallic blocks approximating the shape of, and contacting throughout with, the said end walls of the casing, and a wearing body portion contained within the shell and extending between said metallic blocks.

Signed at Suffern, in the county of Rockland, and State of New York, this 23 day of December, A. D. 1913.

HARRY JONES.
ROBERT C. AUGUR.

Witnesses:
EVELYN E. HALDEMAN,
ALFRED B. RONK.

Copies of this patent may be obtained for five cents each, by addressing the "Commissioner of Patents, Washington, D. C."